United States Patent
Ollila

(10) Patent No.: US 10,725,292 B2
(45) Date of Patent: Jul. 28, 2020

(54) GAZE-TRACKING SYSTEM AND APERTURE DEVICE

(71) Applicant: Varjo Technologies Oy, Helsinki (FI)

(72) Inventor: Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 81 days.

(21) Appl. No.: 15/886,202

(22) Filed: Feb. 1, 2018

(65) Prior Publication Data

US 2019/0235236 A1 Aug. 1, 2019

(51) Int. Cl.
*G02B 27/00* (2006.01)
*G02B 27/09* (2006.01)
*G02B 27/01* (2006.01)

(52) U.S. Cl.
CPC ....... *G02B 27/0093* (2013.01); *G02B 27/017* (2013.01); *G02B 27/0172* (2013.01); *G02B 27/0977* (2013.01); *G02B 2027/0138* (2013.01)

(58) Field of Classification Search
None
See application file for complete search history.

(56) References Cited

U.S. PATENT DOCUMENTS 10,108,261 B1 * 10/2018 Hall .................. G06F 3/013
2008/0165368 A1 * 7/2008 Matsumoto .......... G03F 9/7026
356/614

2010/0079884 A1 * 4/2010 Gere .................. G02B 5/20
359/887
2014/0361957 A1 * 12/2014 Hua .................. G06F 3/013
345/8
2015/0177514 A1 * 6/2015 Maimone ........... G02B 27/0101
345/8

(Continued)

FOREIGN PATENT DOCUMENTS

| EP | 2380345 A1 | 7/2010 |
| WO | 2005/046465 A1 | 5/2005 |
| WO | 2007/043954 A1 | 4/2007 |

OTHER PUBLICATIONS

International Search Report and Written Opinion received for International Patent Application No. PCT/FI2019/050059, dated May 2, 2019, 18 pages.

(Continued)

*Primary Examiner* — Kate H Luo
(74) *Attorney, Agent, or Firm* — Ziegler IP Law Group LLC.

(57) ABSTRACT

A gaze-tracking system for use in a head-mounted display apparatus and an aperture device. The gaze-tracking system includes a first light source and a second light source operable to emit light of first and second type respectively; an image sensor operable to capture an image of the user's eye and reflections of the light of first type from the user's eye; a primary lens; an aperture device positioned between the image sensor and the primary lens, and a processor configured to control the first and second light sources and image sensor, and to process the captured image to detect a gaze direction of the user. The aperture device provides a first aperture to the light of first type and a second aperture to the light of second type, the first aperture and the second aperture being substantially concentric, the first aperture being smaller than the second aperture.

11 Claims, 4 Drawing Sheets

(56) References Cited

U.S. PATENT DOCUMENTS

| | | | |
|---|---|---|---|
| 2015/0177831 A1* | 6/2015 | Chan | G06F 3/013 345/156 |
| 2016/0103484 A1* | 4/2016 | Guo | G06F 3/005 345/156 |
| 2017/0004363 A1* | 1/2017 | Dore | G02B 27/0176 |
| 2017/0090562 A1* | 3/2017 | Gustafsson | G06K 9/00604 |
| 2017/0111557 A1* | 4/2017 | Ko | G02B 5/208 |
| 2018/0004289 A1* | 1/2018 | Wilson | G06K 9/209 |
| 2018/0232048 A1* | 8/2018 | Popovich | A61B 3/113 |
| 2018/0239423 A1* | 8/2018 | Mardanbegi | A61B 3/113 |
| 2018/0249906 A1* | 9/2018 | Gramatikov | A61B 3/0025 |

OTHER PUBLICATIONS

Bimber, Oliver, et al., "Near-Eye Displays", Chapter 10 of Displays: Fundamentals, Application and Outlook (eBook), Jul. 5, 2011, pp. 439-503.

* cited by examiner

GAZE-TRACKING SYSTEM AND APERTURE DEVICE

TECHNICAL FIELD

The present disclosure relates generally to display apparatuses; and more specifically, to gaze-tracking systems for use in head-mounted display apparatuses, such gaze-tracking systems comprising light sources, image sensors, primary lenses, aperture devices and processors. Furthermore, the present disclosure also relates to aperture devices for use in cameras.

BACKGROUND

In recent times, there has been a rapid increase in use of technologies such as virtual reality, augmented reality, mixed reality, and so forth, for presenting a simulated environment (or a simulated world) to a user. Typically, the user uses a specialized device (for example, such as a virtual reality device, an augmented reality device, a mixed reality device, and the like) for experiencing such a simulated environment. In use, the user generally wears (namely, supports) the specialized device on his/her head.

Nowadays, such specialized devices often employ a technique such as gaze-tracking (namely, eye tracking) to determine a gaze direction of the user. Typically, the gaze-tracking is associated with determination of position of pupils of the user's eyes. Generally, an illumination source is employed for emitting light towards the user's eyes, and an imaging device is employed for capturing an image depicting reflection(s) of the emitted light from the user's eyes. Furthermore, the reflection(s) of the emitted light from the user's eyes is used as a frame of reference for determining the position of the pupils of the user's eyes with respect thereto.

However, there exist limitations associated with implementation of such gaze-tracking techniques. As an example, the existing imaging devices are limited in their ability to fully focus all regions of the user's eye in the captured image. Typically, the imaging devices focus light travelling through different optical distances with different sharpness. Therefore, the imaging devices often precisely focus light emanating from only one region of the user's eye at a given time. In such a case, the focused region and regions proximal thereto are captured with substantial sharpness and clarity in the captured image whereas other region(s) of the user's eye appear blurred in the captured image. In an example, regions substantially corresponding to the pupils of the user's eyes may be well-focused whilst other regions of the user's eyes may appear blurred in the captured image. Such blurriness within the captured images of the user's eyes severely limits accuracy of the determined gaze direction of the user.

Therefore, in light of the foregoing discussion, there exists a need to overcome the aforementioned drawbacks associated with conventional equipment and techniques for gaze-tracking.

SUMMARY

The present disclosure seeks to provide a gaze-tracking system for use in a head-mounted display apparatus.

The present disclosure also seeks to provide an aperture device for use in a camera.

The present disclosure seeks to provide a solution to the existing problem of inaccuracies in existing gaze-tracking techniques due to sub-optimal imaging the user's eyes. An aim of the present disclosure is to provide a solution that overcomes at least partially the problems encountered in the prior art, and provides a robust, accurate and efficient gaze-tracking system, and a simple aperture device.

In one aspect, an embodiment of the present disclosure provides a gaze-tracking system for use in a head-mounted display apparatus, the gaze-tracking system comprising:

a first light source, the first light source being operable to emit light of a first type, wherein the light of the first type is to be directed towards a user's eye when the head-mounted display apparatus is worn by the user;

a second light source, the second light source being operable to emit light of a second type, wherein the light of the second type is to be used to diffusely illuminate the user's eye when the head-mounted display apparatus is worn by the user;

an image sensor, the image sensor being operable to capture an image of the user's eye and reflections of the light of the first type from the user's eye, wherein the reflections of the light of the first type appear as at least one glint in the captured image, while the light of the second type enables pupil detection in the captured image, an optical path of the light of the first type being longer than an optical path of light related to the user's eye;

a primary lens associated with the image sensor;

an aperture device, the aperture device being positioned between the image sensor and the primary lens, wherein the aperture device provides a first aperture to the light of the first type and a second aperture to the light of the second type, the first aperture and the second aperture being substantially concentric, the first aperture being smaller than the second aperture; and a processor coupled in communication with the first light source, the second light source and the image sensor, the processor being configured to control the first light source, the second light source and the image sensor, and to process the captured image to detect a gaze direction of the user.

In another aspect, an embodiment of the present disclosure provides a aperture device for use in a camera, the aperture device comprising a first portion and a second portion that are substantially concentric with each other, a periphery of the second portion being larger than a periphery of the first portion, wherein the first portion is substantially transparent to light of a first type as well as light of a second type, while the second portion is substantially transparent to the light of the second type, but is substantially non-transparent to the light of the first type.

Embodiments of the present disclosure substantially eliminate or at least partially address the aforementioned problems in the prior art, and enables accurate and efficient tracking of the user's gaze.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
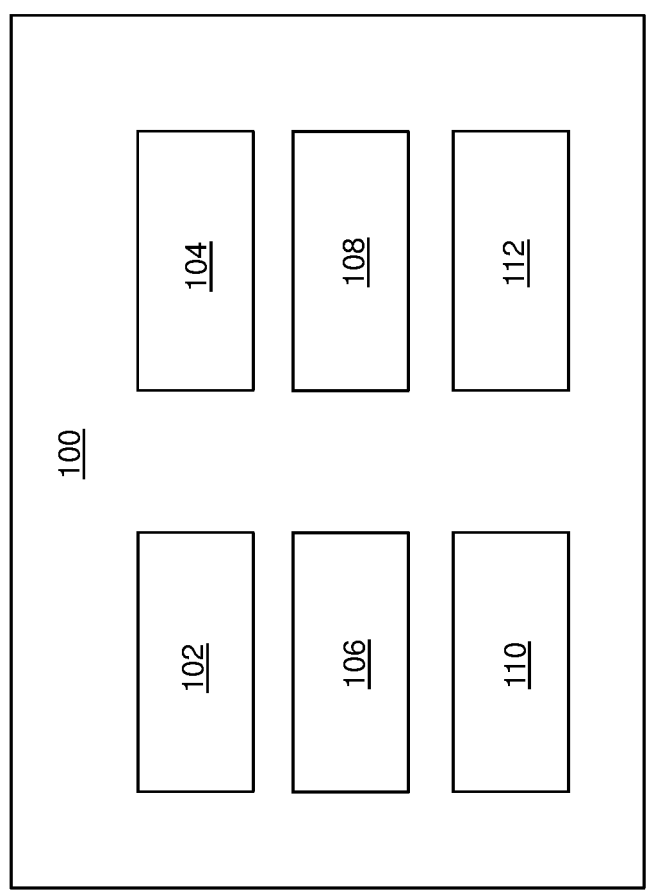
FIG. 1 illustrates a block diagram of a gaze-tracking system for use in a head-mounted display apparatus, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a gaze-tracking system for use in a head-mounted display apparatus, the gaze-tracking system comprising:

a first light source, the first light source being operable to emit light of a first type, wherein the light of the first type is to be directed towards a user's eye when the head-mounted display apparatus is worn by the user;

a second light source, the second light source being operable to emit light of a second type, wherein the light of the second type is to be used to diffusely illuminate the user's eye when the head-mounted display apparatus is worn by the user;

an image sensor, the image sensor being operable to capture an image of the user's eye and reflections of the light of the first type from the user's eye, wherein the reflections of the light of the first type appear as at least one glint in the captured image, while the light of the second type enables pupil detection in the captured image, an optical path of the light of the first type being longer than an optical path of light related to the user's eye;

a primary lens associated with the image sensor;

an aperture device, the aperture device being positioned between the image sensor and the primary lens, wherein the aperture device provides a first aperture to the light of the first type and a second aperture to the light of the second type, the first aperture and the second aperture being substantially concentric, the first aperture being smaller than the second aperture; and a processor coupled in communication with the first light source, the second light source and the image sensor, the processor being configured to control the first light source, the second light source and the image sensor, and to process the captured image to detect a gaze direction of the user.

In another aspect, an embodiment of the present disclosure provides an aperture device for use in a camera, the aperture device comprising a first portion and a second portion that are substantially concentric with each other, a periphery of the second portion being larger than a periphery of the first portion, wherein the first portion is substantially transparent to light of a first type as well as light of a second type, while the second portion is substantially transparent to the light of the second type, but is substantially non-transparent to the light of the first type.

The present disclosure provides the aforementioned gaze-tracking system and the aforementioned aperture device. The aforementioned gaze-tracking system allows for accurately focusing different regions of the user's eye that are at different optical distances from the image sensor. Notably, in such a gaze-tracking system, the aperture device facilitates sharp focusing of the reflections of light from such different regions of the user's eye at the image sensor. Therefore, the captured image of the user's eye is substantially sharp and has minimal or no blurriness. Consequently, the determined gaze direction of the user is highly accurate. Furthermore, the gaze-tracking system and the aperture device are simple, robust and reliable.

Throughout the present disclosure, the term "head-mounted display apparatus" used herein relates to specialized equipment that is configured to present a simulated environment (for example, such as a virtual reality environment, an augmented reality environment or a mixed reality environment) to the user thereof when the head-mounted display apparatus is worn by the user on his/her head. In such an instance, the head-mounted display apparatus is operable to act as a device (for example, such as a virtual reality headset, an augmented reality headset, a pair of virtual reality glasses, a pair of mixed reality glasses, and so forth) for presenting an input image representing the simulated environment to the user.

According to an embodiment, the term "input image" relates to a representation of a visual scene of a fully-virtual simulated environment (for example, a virtual reality environment) to be displayed via the head-mounted display apparatus.

According to another embodiment, the term "input image" relates to a representation of a visual scene depicting at least one virtual object overlaid on a real world image. Examples of the at least one virtual object include, but are not limited to, a virtual navigation tool, a virtual gadget, a virtual message, a virtual entity, and a virtual media. In such an instance, the at least one virtual object overlaid on the real world image constitutes a visual scene of a resultant simulated environment (for example, an augmented reality environment, a mixed reality environment, and so forth). Notably, the term "real world image" relates to an image depicting actual surroundings of the user whereat he/she is positioned. Optionally, the head-mounted display apparatus comprises an imaging system to capture the real world image. More optionally, the head-mounted display apparatus further comprises at least one optical equipment (for example, such as a mirror, a lens, a prism, and the like) to implement aforesaid overlaying operation and to project the resultant simulated environment onto the user' eyes.

According to yet another embodiment, the term "input image" used herein relates to a visual scene depicting a pictorial representation (namely, a visual perception) of a subject. Examples of the subject include, but are not limited to, an object, a person, a map, a painting, a graphical diagram, and text. Optionally, the input image is a two-dimensional representation of the subject.

Throughout the present disclosure, the term "gaze-tracking system" used herein relates to specialized equipment for detecting a direction of gaze (namely, the gaze direction) of the user. The head-mounted display apparatus uses the gaze-tracking system for determining the aforesaid gaze direction via non-invasive techniques. Beneficially, an accurate detection of the gaze direction facilitates the head-mounted display apparatus to closely implement gaze contingency thereon. As an example, the gaze-tracking system may be employed to detect the gaze direction of the user's eye for projecting (i) a region of a visual scene whereat the user's gaze is focused, on and around the fovea of the user's eye, and (ii) a remaining region of the visual scene on the retina of the user's eye, of which the fovea is just a small part. Therefore, even upon a change in the gaze direction (namely, due to a movement of the user's eye), active foveation is implemented within the head-mounted display apparatus.

It is to be understood that the gaze-tracking system may also be referred to as an "eye-tracker system", a "means for detecting a gaze direction", a "means for tracking a gaze direction", or a "gaze-tracking unit".

Throughout the present disclosure, the term "first light source", used herein relates to equipment configured to emit the light of the first type towards the user's eye. The first light source is employed to emit the light of the first type to illuminate at least a portion of the user's eye when the head-mounted display apparatus is worn by the user. It will be appreciated that the light of the first type emitted by the first light source is reflected from an outer surface (for example, such as cornea) of the user's eye, thereby constituting corneal reflections (namely, glints) in the user's eye.

Optionally, the first light source emits the light of the first type periodically or intermittently. Alternatively, optionally, the first light source emits light of the first type continuously.

Optionally, the first light source is implemented by way of at least one of: infrared light-emitting diodes, infrared lasers, infrared light projectors, infrared displays, visible light-emitting diodes, visible light lasers, visible light projectors, visible light displays.

In an embodiment, the first light source is operable to illuminate one eye of the user. In another embodiment, the first light source is operable to illuminate both eyes of the user.

Optionally, an intensity of the light of the first type is adjustable. Optionally, in this regard, the processor is configured to control the first light source to adjust the intensity of the emitted light of the first type.

Optionally, in operation, the first light source emits the light of the first type in a direction that is substantially along a view direction of the user's eye.

Alternatively, optionally, in operation, the first light source emits the light of the first type in a direction that is at a predefined angle to a view direction of the user's eye. Optionally, in this regard, the gaze-tracking system further comprises at least one substantially-reflective optical element for reflecting the light of the first type emitted by the first light source towards the user's eye. In such a case, the at least one substantially-reflective optical element is positioned on the optical path of the emitted light of the first type, namely between the first light source and the user's eye. As an example, the light of the first type can be emitted by the first light source in a direction that is substantially perpendicular to a view direction of the user's eye. In such an example, the at least one substantially-reflective optical element could be arranged in a manner that the emitted light of the first type is reflected towards the user's eye. Optionally, the at least one substantially-reflective optical element is implemented by way of at least one of: a semi-transparent mirror, a fully reflective mirror, a semi-transparent reflector, a prism, a polarizer.

More optionally, the predefined angle may be selected so as to reduce a size of the gaze-tracking system. In an embodiment, the predefined angle ranges from 120 degrees to 240 degrees. In such an instance, the predefined angle may be, for example, such as 120, 130, 140, 150, 160, 170, 180, 190, 200, 210, 220, 230, or 240 degrees with respect to a view direction of the user's eye. In another embodiment, the predefined angle is lesser than 120 degrees (for example, such as 90, 95, 100, 105, 110, or 115 degrees) or greater than 240 degrees (for example, such as 245, 250, 255, 260, 265, or 270 degrees) with respect to the view direction of the user's eye.

Throughout the present disclosure, the term "second light source", used herein relates to equipment configured to emit the light of the second type for diffusely illuminating the user's eye when the head-mounted display apparatus is worn by the user. Notably, the second light source emits the light of the second type to fully (namely, completely) illuminate the user's eye. It will be appreciated that the diffused (namely, softened) light of the second type uniformly illuminates the entire region of the user's eye in a manner that unwanted reflections and shadows at the surface of the user's eye are minimized. Therefore, the light of the second type is related to the user's eye.

Optionally, the second light source is implemented by way of at least one of: infrared light-emitting diodes, infrared light projectors, infrared displays, visible light-emitting diodes, visible light projectors, visible light displays.

It will be appreciated that the terms "light of the first type" and the "light of the second type" are merely used to distinguish between characteristics (for example, such as wavelength, frequency, intensity, and the like) of the lights emitted by the first light source and the second light source.

In operation, the reflections of the light of the first type and reflections of the light of the second type are reflected from the user's eye (for example, from the cornea of the user's eye) towards the image sensor. Notably, the image sensor is positioned on the optical path of the reflections of the light of the first type and the second type. In such a case, the image sensor is to be positioned in a manner that the user's view is not obstructed.

Throughout the present disclosure, the term "image sensor" relates to equipment that is operable to capture the image of the user's eye (by way of the reflections of the light of the second type) and the reflections of the light of the first type from the user's eye. Optionally, the image sensor comprises a plurality of photo sensors arranged in a grid-like manner. Examples of the plurality of photo sensors include, but are not limited to, photodiodes, photoresistors, phototransistors, and photosensitive field effect transistors.

The reflections of the light of the first type appear as the at least one glint in the captured image. Beneficially, the at least one glint is utilized as a frame of reference to detect the position of the user's pupil within the user's eye. Optionally, the at least one glint is to have a predefined shape. Examples of the predefined shape include, but are not limited to, a substantially circular shape, a polygonal shape, a rounded-polygonal shape, a random freeform shape, text, a pattern, and a design. In an example, the predefined shape may include linear, circular, triangular, rectangular, or concentric circular (such as, circles having decreasing or increasing diameters with respect to each other and having a common center) patterns. In another example, the predefined shape may include text (such as one or more alphabets), symbols (such as symbol for Greek letter omega (Ω)), designs (such as logos) and so forth.

Optionally, the gaze-tracking system comprises at least one mask positioned on the optical path of the light of the first type, wherein the at least one mask is to be used to define a shape of the light of the first type, such that the at least one glint has the predefined shape. Throughout the disclosure, the term "at least one mask" relates to equipment configured to modify the shape of the light of the first type. The at least one mask is to be arranged on the optical path of the light of the first type, namely between the first light source and the user's eye. In operation, the emitted light of the first type is incident upon the at least one mask. Thereafter, the at least one mask modifies a structure of the light of the first type whilst directing the light of the first type having the modified shape towards the user's eye.

Optionally, the at least one mask may be implemented by way of at least one optical element. The at least one optical element is configured to modify the structure of the light pulses by reflections and/or refraction thereof. More optionally, the at least one optical element is a freeform optical element and a light guide. Throughout the present disclosure, the term "freeform optical element" used herein relates to optical elements that are not spherical and/or rotationally symmetric. Optionally, in this regard, the freeform optical element comprises a freeform lens. Such a freeform lens may have different optical powers at different areas (namely, regions) thereof. In an example, a surface of the freeform lens may have a triangular shape formed therein. Such a triangular shape of the surface of the freeform lens is capable of focusing (namely, modifying) light of the first type (emitted by the first light source) incident thereupon to form the light having a substantially triangular shape. Thereafter, when the light of the triangular shape is incident upon the surface of the user's eye its reflections appear in a form of at least one glint having the triangular shape.

Optionally, the first light source comprises a plurality of illuminators arranged in a predefined pattern to define the shape of the light of the first type, such that the at least one glint has the predefined shape. For example, when the glint is to have a V-shape, the plurality of illuminators may be arranged along a V-shaped pattern to define the shape of the light of the first type.

The light of the second type enables pupil detection in the captured image. It will be appreciated that since the light of the second type diffusely illuminates the user's eye, the reflections of the light of the second type allow for imaging the user's eye at the image sensor in a manner that the user's pupil is clearly visible in the captured image. Such a depiction of the user's pupil facilitates pupil detection in the captured image.

Furthermore, the optical path of the light of the first type is longer than the optical path of light related to the user's eye. It is to be understood that the optical path of the light of the first type corresponds to an optical path between the first light source and the image sensor, via the user's eye. Furthermore, since the light of the second type is diffuse in nature, the optical path of the light of the second type substantially corresponds to an optical path from the user's eye to the image sensor.

Throughout the present disclosure, the term "primary lens" used herein relates to an optical element that is configured to modify/alter an optical path of the reflections of the light of the first type and the second type in a manner that the aforesaid reflections are well-focused onto an imaging surface of the image sensor. Such a primary lens may also be referred to as an "objective lens" associated with the image sensor. The primary lens is arranged on the optical path of the reflections of the light of the first type and the second type, namely, between the user's eye and the image sensor.

Optionally, the gaze-tracking system comprises at least one first actuator for moving the primary lens with respect to the image sensor, wherein the processor is configured to control the at least one first actuator. In such a case, the at least one first actuator moves (for example, displaces, rotates, tilts, and so forth) the primary lens with respect to the image sensor. It will be appreciated that the primary lens may be moved for accurately focusing the reflections of the light of the second type onto the imaging surface of the image sensor. Beneficially, such focused reflections of the light of the second type facilitates in capturing a sharp and clear image of the user's pupil within the user's eye.

Optionally, the processor is configured to control optical properties associated with primary lens (for example, such as refractive index, magnification, and the like).

Optionally, the primary lens is implemented by way of at least one of: a convex lens, a concave lens, a plano-convex lens, a plano-concave lens, a Liquid Crystal (LC) lens, and a liquid lens.

It will be appreciated that the lights of the first type and the second type originate from two different sources (namely, the first light source and the second light source respectively) and travel through different optical paths. Furthermore, optical natures of the lights of the first type and the second type are different since the light of the first type constitutes the at least one glint in the user's eye whereas the light of the second type diffusely illuminates the user's eye. Therefore, the optical properties of the primary lens may allow for accurately focusing only one of the reflections of the light of the first type and the second type onto the image sensor. For example, the primary lens may optimally focus the reflections of the light of the second type onto the image sensor whilst sub-optimally focusing the reflections of the light of the first type onto the image sensor. Therefore, the aperture device may compensate for such focusing characteristics of the primary lens by allowing for accurately focusing the reflections of the light of the first type onto the image sensor.

Throughout the present disclosure, the term "aperture device" used herein relates to an optical element configured to control an amount of reflections of light of the first type and the second type that pass therethrough towards the image sensor. The aperture device is arranged on the optical path of the reflections of the light of the first type and the second type, namely, between the primary lens and the image source. Additionally, the aperture device also allows for accurately focusing the reflections of the light of the first type onto the imaging surface of the image sensor.

The aperture device provides the first aperture to the light of the first type and the second aperture to the light of the second type. The first aperture and the second aperture are substantially concentric. Furthermore, the first aperture is smaller than the second aperture. The first aperture of the aperture device allows the reflections of the light of the first type and the second type to pass therethrough. The second aperture allows the reflections of the light of second type to pass therethrough, whilst blocking the reflections of the light of first type to pass therethrough.

In an example, the aperture device may be cylindrical in shape. In such an example, a shape of the first and second apertures may be substantially circular, wherein the first aperture has a smaller radius than the second aperture. When the reflections of light of the first type are incident upon the aperture device, the reflections of light of the first type may be allowed to pass through only the first aperture. Furthermore, when the reflections of light of the second type are incident upon the aperture device, the reflections of light of the second type may be allowed to pass through both the first and second apertures.

It will be appreciated that the aperture device is not limited to only a cylindrical shape, and can have any suitable shape, for example, such as a spherical shape, an ellipsoid shape, a polygonal prism shape (for example, a cuboidal shape), and so on. In such a case, the first and second apertures have suitable shapes, for example, such as a circular shape, an ellipse shape, a polygonal shape, and so on.

Optionally, the image sensor, the primary lens and the aperture device are implemented as components of a camera for imaging the user's eye. Examples of such a camera include, but are not limited to, a digital camera, a black and white camera, a Red-Green-Blue (RGB) camera and an Infra-Red (IR) camera.

The processor is coupled in communication with the first light source, the second light source and the image sensor. The processor is configured to control the first and the second light sources to emit lights of the first type and the second type respectively, and control the image sensor to capture the image using the reflections of light of the first type and the reflections of light of the second type. In an embodiment, the processor is implemented by way of hardware, software, firmware or a combination of these, suitable for controlling the operation of the gaze-tracking system to detect the gaze direction of the user. The processor is configured to process the captured image to detect the gaze direction of the user. Specifically, the form and position of the at least one glint with respect to the user's pupil depicted in the captured image, are employed to determine the gaze direction of the user's eye.

Optionally, the captured image is processed by employing at least one image processing algorithm. The at least one image processing algorithm is employed to detect the pupil of the user's eye and the at least one glint (namely, the reflections of the light of the first type) within the captured image. Therefore, the at least one image processing algorithm is employed to analyze a relationship between the positions of the user's pupil and the at least one glint, to accurately detect the gaze direction of the user.

Optionally, a plurality of such images of the user's eye and the reflections of the light of the first type are captured using the image sensor. In such a case, the image processing algorithm is optionally implemented for each image of the user's eye. It will be appreciated that a change in the relative positions of the user's pupil and the reflections of the light of the first type, as depicted within the plurality of captured images, is indicative of a change in the gaze direction of the user.

According to an aspect of the present disclosure, the aperture device comprises the first portion and the second portion that are substantially concentric with each other, the periphery of the second portion being larger than the periphery of the first portion, wherein the first portion is substantially transparent to the light of the first type as well as the light of the second type, while the second portion is substantially transparent to the light of the second type, but is substantially non-transparent to the light of the first type, further wherein the first portion acts as the first aperture, while the first portion and the second portion together act as the second aperture. Therefore, the first portion substantially passes the reflections of the light of the first type and the second type therethrough whereas the second portion substantially passes only the reflection of the light of the second type therethrough. It will be appreciated that shapes of the first and second portions substantially corresponds to desired shapes of the first and second apertures.

Optionally, the light of the first type is light in a first wavelength range and the light of the second type is light in a second wavelength range, wherein the second portion is made of a material that is substantially transparent to the light in the second wavelength range, but is substantially non-transparent to the light in the first wavelength range. Optionally, the first wavelength range includes infrared wavelength or a near-infrared wavelength. The light of the first type, having infrared or near-infrared wavelength, is invisible to the human eye, thereby, reducing unwanted distraction when such light is incident upon the user's eye. Furthermore, optionally, the second wavelength range includes visible light wavelength. Alternatively, optionally, the second wavelength range includes infrared wavelength or a near-infrared wavelength, wherein such infrared wavelength or near-infrared wavelength is different from the first wavelength range. In an example, the second portion is made of a material such as vanadium dioxide.

Optionally, the first portion is made of a material that is substantially transparent to the light in the first wavelength range as well as the light in the second wavelength range. More optionally, the first portion may be made of at least one of: a transparent mirror, a semi-transparent mirror, transparent film, semi-transparent film, a transparent foil, a semi-transparent foil.

Optionally, the second portion is implemented by way of a first optical filter that allows the light of the second type having the visible wavelength range to pass therethrough, whilst blocking the light of the first type having the infrared wavelength or the near-infrared wavelength. Optionally, in this regard, the first optical filter is implemented by way of at least one of: a bandpass filter, infrared cut-off filter.

Optionally, the first optical filter absorbs the light of the first type. In such an instance, the absorptive properties of the first optical filter allow for blocking the light of first type to pass therethrough whilst reducing the unwanted reflections by absorbing such unwanted light of first type.

Optionally, the first optical filter reflects the light of the first type. In such an instance, the first optical filter comprises a plurality of layers having different refractive indices to exploit interference of light for implementing the aforesaid reflection effect. Such a first optical filter could be manufactured by deposition of plurality of thin film infrared filters on a substrate (for example, such as a glass) by sputtering. Notably, the plurality of thin film infrared filters constitute a stack of thin layers (of different optical materials with varying indexes of refraction) having controlled thicknesses. The light of the first type is reflected at each interface of the plurality of layers.

Optionally, cut-off properties of the first optical filter having reflective properties are better than cut-off properties of the first optical filter having absorptive properties.

Optionally, the first portion is implemented by way of a second optical filter that allows the light of the first type and the second type to pass therethrough whilst blocking lights of other wavelengths. Optionally, the second optical filter is implemented by way of at least one of: an infrared pass filter, an infrared bandpass filter.

Optionally, the second optical filter is implemented using a combination of an infrared pass filter and the infrared cut-off filter. In such a case, the second optical filter with absorptive properties may be employed as a substrate whereupon multiple layers of the infrared cut-off filter and/or the infrared pass filter are coated. Therefore, if both the light of the first type and the light of the second type have different infrared wavelengths, the second optical filter may block the infrared light of the first type and pass the infrared light of the second type therethrough. Optionally, a thickness of each of the layers is $\lambda/4$, wherein $\lambda$ is the wavelength of the light of the first type.

Optionally, the light of the first type is light polarized at a first polarization orientation, wherein the second portion is implemented by way of a polarizer that is to be aligned to block the light polarized at the first polarization orientation. Optionally, in this regard, the first light source comprises a polarizing element configured to polarize a given light at the first polarization orientation to generate the polarized light of the first type. Alternatively, optionally, the polarizing element is arranged on the optical path of the light of the first type such that unpolarized light of the first type (from the first light source) is incident thereupon and the polarized light of the first type is passed therethrough towards the user's eye. It will be appreciated that the polarizing element is configured to perform an optical filtering operation by converting the light of the first type, having undefined or mixed polarization, into the light of the first type having the first polarization orientation. Furthermore, the second portion of the aperture device is implemented by the way of the polarizer. Optionally, the polarizer is configured to block the light of the first type that is polarized at the first polarization orientation, whilst allowing light of other polarization orientations to pass therethrough.

In an embodiment, the polarizer is a circular polarizing element. In another embodiment, the polarizer is a linear polarizing element.

Optionally, the polarizer is implemented by way of at least one of: thin film polarizer, Polaroid® polarizing filter, absorptive crystal polarizer, birefringent polarizer. As an example, the polarizer may be implemented by way of a thin film polarizer including a substrate (for example, such as glass, plate, and the like) whereon a thin film of a specialized optical coating is applied. In such a case, the specialized optical coating (for example, such as a dielectric material) may be configured to implement the desired polarization effect. As a further example the polarizer can be wire grid type polarizer. The wire grid type polarizer comprises metallic wires embedded in a substrate. Benefit of the wire grid type polarizer is that it can be printed using roll-to-roll technology even to flexible base.

Optionally, polarization properties of the polarizer are adjustable, wherein the processor is configured to adjust the polarization properties of the polarizer as desired.

Furthermore, optionally, the first portion is a polarizer that does not block the light polarized at the first polarization orientation. In such a case, the first portion may block light of a second polarization orientation whilst allowing the polarized light of the first type as well as the light of the second type (having undefined or mixed polarization orientation) to pass therethrough.

Alternatively, optionally, the first portion is made of a material that has no polarizing effect. In such a case, the first portion allows all light waves having defined, undefined or mixed polarizations to pass therethrough. Optionally, in such a case, the first portion is implemented by way of at least one of: a transparent mirror, a semi-transparent mirror, transparent film, semi-transparent film, a transparent foil, a semi-transparent foil.

Optionally, the first portion is an opening that allows the light of the first type and the light of the second type to pass therethrough. In such a case, the aperture device is designed in a manner that a space (namely, a gap) is provided therein to provide the first portion. Optionally, the gap is concentric with the second portion. Furthermore, optionally, a shape of the gap is substantially similar to the shape of the second portion.

Optionally, the gaze-tracking system further comprises at least one semi-transparent reflective element to be arranged on the optical path of the reflections of the light of the first type and the second type, such that when incident upon the at least one semi-transparent reflective element, the reflections of the light of the first type and the second type are reflected towards the image sensor. In other words, the reflections of the light of the first type and the second type from the user's eye are directed towards the image sensor via the at least one semi-transparent reflective element. Throughout the present disclosure, the term "at least one semi-transparent reflective element" used herein relates to at least one optical component having substantially-reflective properties that allow for altering the optical path of the reflections of the light of the first type and the second type via reflection therefrom.

Optionally, the at least one semi-transparent reflective element includes a first side and a second side, opposite to the first side, wherein the first side is facing towards the user's eye when the head-mounted display apparatus is worn by the user. In such a case, the reflections of the light of the first type and the second type are incident upon the first side of the at least one semi-transparent reflective element wherefrom the aforesaid reflections are directed towards the image sensor.

In an embodiment, the at least one semi-transparent reflective element has a substantially-flat shape. In another embodiment, the at least semi-transparent one reflective element has a substantially-curved shape. In yet another embodiment, the at least one semi-transparent reflective element has a substantially-freeform shape. In such a case, optionally, the freeform shape is implemented as a combination of flat and curved surfaces including protrusions and depressions on a surface of the at least one semi-transparent reflective element.

Optionally, the at least one semi-transparent reflective element is implemented by way of at least one of: a semi-transparent mirror, a semi-transparent film, a prism, a polarizer, an optical waveguide.

Optionally, the gaze-tracking system comprises at least one second actuator associated with the at least one semi-transparent reflective element, wherein the at least one actuator is to be employed to adjust a position and/or an orientation of the at least one semi-transparent reflective element. Optionally, the processor is configured to control the at least one second actuator, so as to adjust the at least one semi-transparent reflective element according to the detected gaze direction of the user. Such adjustment of the at least one semi-transparent reflective element allows for accurately focusing the reflections of the light of the first type and the second type even upon change in the detected gaze direction of the user.

Optionally, in the gaze-tracking system, the second light source is implemented by way of at least one image renderer of the head-mounted display apparatus. Optionally, the head-mounted display apparatus comprises at least one image renderer for rendering the input image, wherein a projection of the rendered input image emanating from the at least one image renderer passes towards the user's eye for diffusively illuminating the user's eye.

Optionally, the at least one image renderer is implemented by way of at least one of: a Liquid Crystal Display (LCD), a Light Emitting Diode (LED)-based display, an Organic LED (OLED)-based display, a micro OLED-based display, and a Liquid Crystal on Silicon (LCoS)-based display.

Optionally, the at least one image renderer is implemented by way of a projection screen associated with at least one projector. Optionally, in this regard, the at least one projector is implemented by way of at least one of: a Liquid Crystal Display (LCD)-based projector, a Light Emitting Diode (LED)-based projector, an Organic LED (OLED)-based projector, a Liquid Crystal on Silicon (LCoS)-based projector, a Digital Light Processing (DLP)-based projector, and a laser projector.

Optionally, the second side of the at least one semi-transparent reflective element is substantially transparent for allowing projection of the rendered input image (comprising the light of the second type) to pass therethrough towards the user's eye, and the first side of the at least one semi-transparent reflective element is substantially reflective for allowing the projection of the rendered input image to be reflected towards the image sensor.

The present disclosure also relates to the aperture device for use in the camera as described above. Various embodiments and variants disclosed above apply mutatis mutandis to the aperture device.

Optionally, in the aperture device, the light of the first type is light in the first wavelength range and the light of the second type is light in the second wavelength range, wherein the second portion is made of the material that is substantially transparent to the light in the second wavelength range, but is substantially non-transparent to the light in the first wavelength range.

Optionally, in the aperture device, the first portion is made of the material that is substantially transparent to the light in the first wavelength range as well as the light in the second wavelength range.

Optionally, in the aperture device, the light of the first type is light polarized at the first polarization orientation, wherein the second portion is implemented by way of the polarizer that is to be aligned to block the light polarized at the first polarization orientation.

Optionally, in the aperture device, the first portion is the polarizer that does not block the light polarized at the first polarization orientation.

Optionally, in the aperture device, the first portion is made of the material that has no polarizing effect.

Optionally, in the aperture device, the first portion is the opening that allows the light of the first type and the light of the second type to pass therethrough.

DETAILED DESCRIPTION OF THE DRAWINGS

Referring to FIG. 1, illustrated is a block diagram of a gaze-tracking system 100 for use in a head-mounted display apparatus (not shown), in accordance with an embodiment of the present disclosure. The gaze tracking system 100 comprises a first light source 102 operable to emit light of a first type, a second light source 104 operable to emit light of a second type, an image sensor 106 operable to capture an image of a user's eye and reflections of the light of the first type from the user's eye, a primary lens 108 associated with the image sensor 106, an aperture device 110 positioned between the image sensor 106 and the primary lens 108, and a processor 112 coupled in communication with the first light source 102, the second light source 104 and the image sensor 106. The processor 112 is configured to control the first light source 102, the second light source 104 and the image sensor 106, and to process the captured image to detect a gaze direction of the user.

Figure 2B:
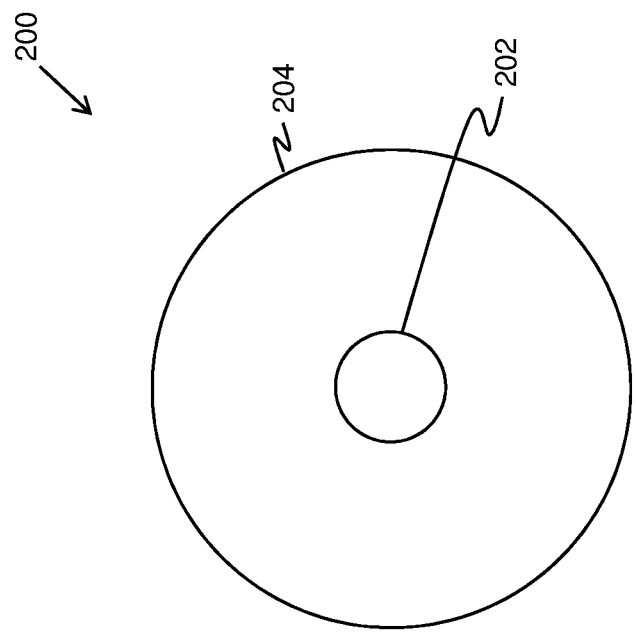
FIGS. 2A and 2B illustrate side and front views of an aperture device for use in a camera respectively, in accordance with an embodiment of the present disclosure.
Figure 2A:
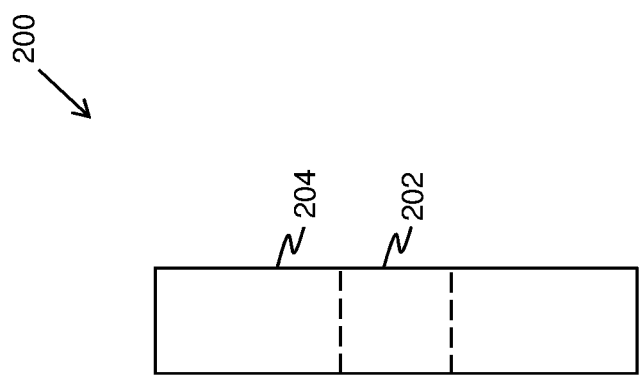

Referring to FIGS. 2A and 2B, illustrated are side and front views of an aperture device 200 for use in a camera (not shown) respectively, in accordance with an embodiment of the present disclosure. Notably, FIG. 2A illustrates the side view of the aperture device 200 and FIG. 2B illustrates the front view of the aperture device 200. The aperture device 200 comprises a first portion 202 and a second portion 204 that are substantially concentric with each other. As shown, a periphery of the second portion 204 is larger than a periphery of the first portion 202. The first portion 202 acts as a first aperture, while the first portion 202 and the second portion 204 together act as a second aperture.

It will be appreciated that the aperture device 200 is not limited to only a cylindrical shape, and can have any suitable shape, for example, such as a spherical shape, an ellipsoid shape, a polygonal prism shape (for example, a cuboidal shape), and so on.

Figure 3A:
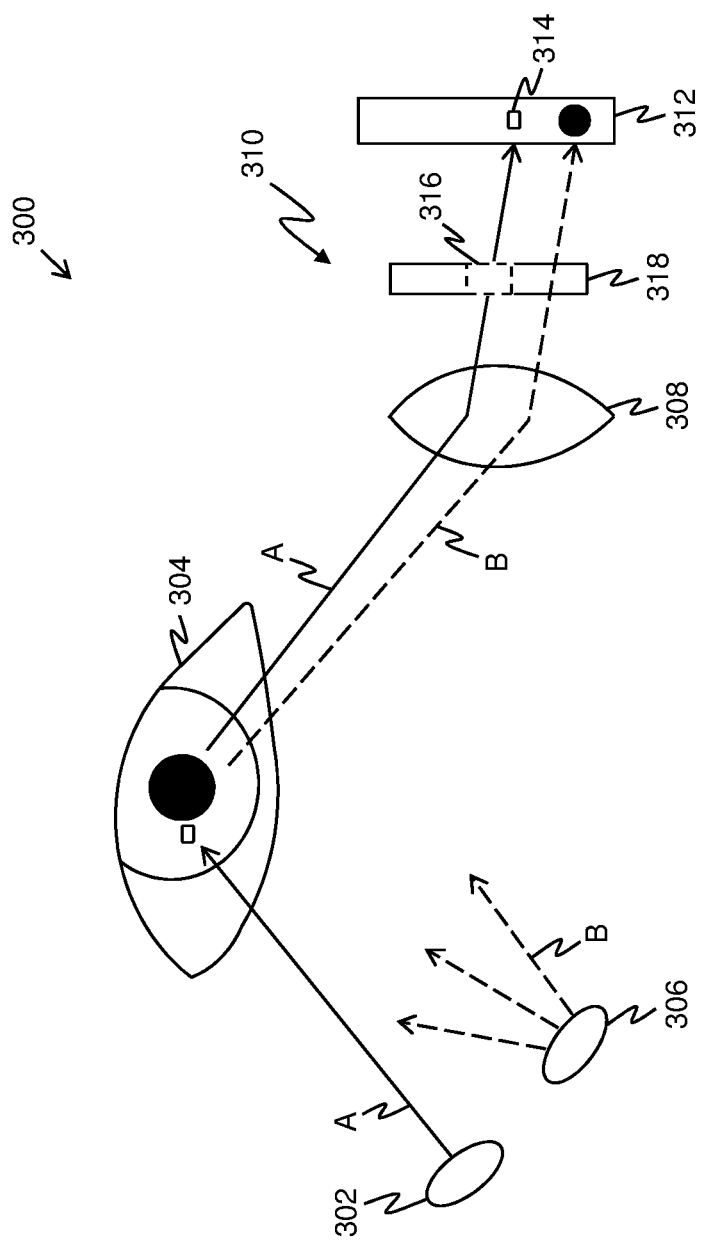
FIGS. 3A and 3B illustrate exemplary implementations of a gaze-tracking system in use within a head-mounted display apparatus, in accordance with different embodiments of the present disclosure.
Figure 3B:
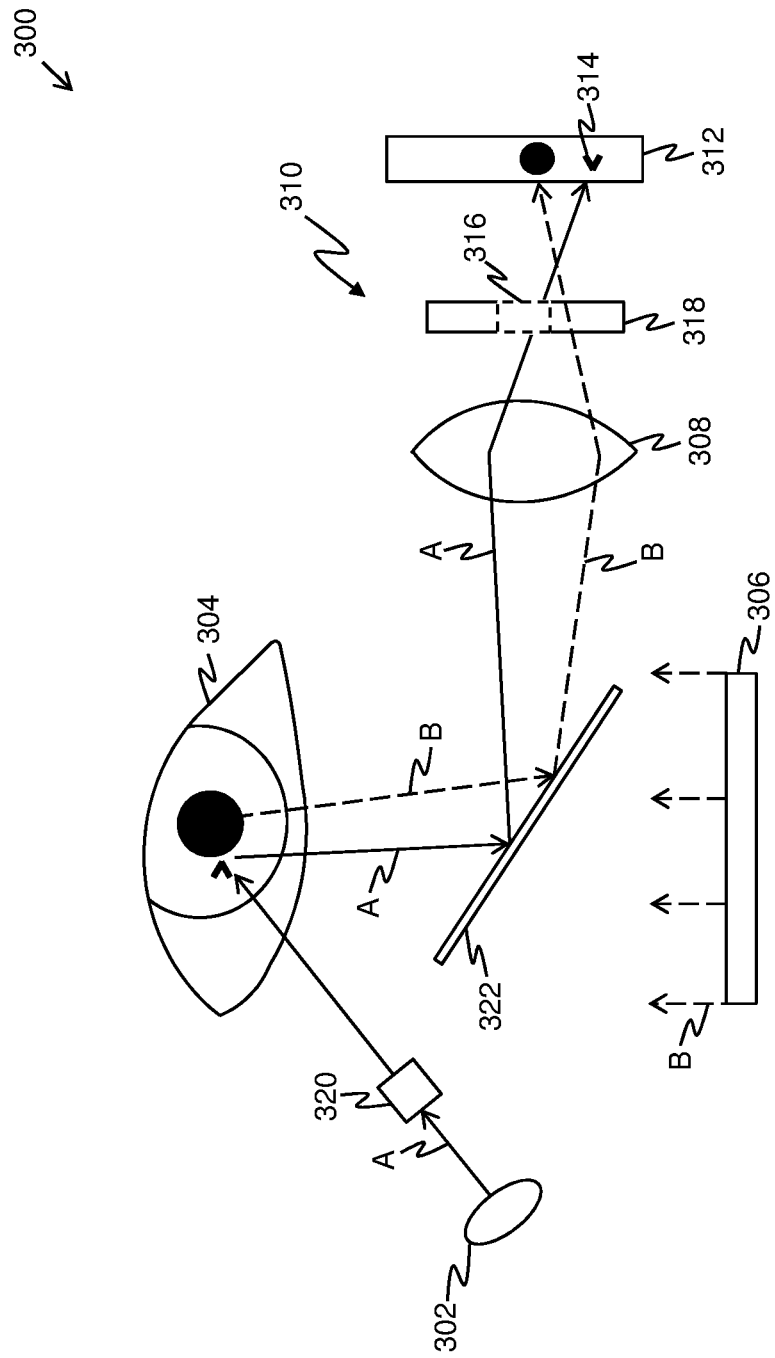

Referring to FIGS. 3A and 3B, illustrated are exemplary implementations of a gaze-tracking system 300 in use within a head-mounted display apparatus (not shown), in accordance with different embodiments of the present disclosure. It may be understood by a person skilled in the art that the FIGS. 3A and 3B include simplified arrangements for implementation of the gaze-tracking system 300 for sake of clarity, which should not unduly limit the scope of the claims herein. The person skilled in the art will recognize many variations, alternatives, and modifications of embodiments of the present disclosure.

As shown in FIGS. 3A and 3B, the gaze-tracking system 300 comprises a first light source 302 operable to emit light of a first type, wherein the light of the first type is to be directed towards a user's eye 304 when the head-mounted display apparatus is worn by the user. Notably, the light of the first type is depicted by ray A. Furthermore, the gaze-tracking system 300 comprises a second light source 306 operable to emit light of a second type, wherein the light of the second type is to be used to diffusely illuminate the user's eye 304 when the head-mounted display apparatus is worn by the user. As shown, the light of the second type is depicted by ray B. Moreover, the gaze-tracking system 300 comprises a primary lens 308, an aperture device 310, an image sensor 312, and a processor (not shown).

In operation, the light of the first type A and the light of the second type B are reflected from the user's eye 304. Thereafter, the reflections of the light of the first type A and the reflections of the light of the second type B pass via the primary lens 308 and the aperture device 310, towards the image sensor 312. The image sensor 312 is operable to capture an image of the user's eye 304 and reflections of the light of the first type A from the user's eye. The reflections of the light of the first type A appear as at least one glint 314 in the captured image, while the light of the second type B enables pupil detection in the captured image. As shown, an optical path of the light of the first type A (namely, a path from the first light source 302 to the image sensor 312, via the user's eye 304) is longer than an optical path of light related to the user's eye 304 (namely, the light of the second type B).

As shown in the gaze-tracking system 300, the aperture device 310 is positioned between the image sensor 312 and the primary lens 308. The aperture device 310 provides a first aperture 316 to the light of the first type and a second aperture 318 to the light of the second type, wherein the first aperture 316 and the second aperture 318 are substantially concentric. Moreover, the first aperture 316 is smaller than the second aperture 318. The first aperture 316 allows both the light of the first type A and the light of the second type B to pass therethrough. The second aperture 318 allows the light of the second type B to pass therethrough, whilst blocking the light of the first type A.

In FIG. 3B, the gaze-tracking system 300 further comprises at least one mask 320 positioned on an optical path of the light of the first type A. In operation, the at least one mask 320 is used to define a shape of the light of the first type A, such that the at least one glint 314 has a predefined shape. Furthermore, the second light source 306 is shown to be optionally implemented by way of at least one image renderer of the head-mounted display apparatus. Moreover, the gaze-tracking system 300 optionally comprises at least one semi-transparent reflective element, depicted as a semi-transparent reflective element 322. The at least one semi-transparent reflective element 322 is arranged on an optical path of the reflections of the light of the first type A and the second type B, such that when incident upon the at least one semi-transparent reflective element 322, the reflections of the light of the first type A and the second type B are reflected towards the image sensor 312.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A gaze-tracking system for use in a head-mounted display apparatus, the gaze-tracking system comprising:
a first light source having a predefined shape operable to emit light of a first type towards a user's eye when the head-mounted display apparatus is worn by the user, the light of the first type having a first wavelength range and a first polarization orientation;
a second light source, the second light source being operable to emit light of a second type, wherein the light of the second type is to be used to diffusely illuminate the user's eye when the head-mounted display apparatus is worn by the user, the light of the second type having a second wavelength range different from the first wavelength range;
an image sensor operable to capture an image of the user's eye and reflections of the light of the first type from the user's eye, wherein the reflections of the light of the first type appear as at least one glint having the predefined shape in the captured image, while the light of the second type enables pupil detection in the captured image, an optical path of the light of the first type being longer than an optical path of light related to the user's eye;
a primary lens associated with the image sensor;
an aperture device, the aperture device being positioned between the image sensor and the primary lens, wherein the aperture device provides a first aperture to the light of the first type and a second aperture to the light of the second type, the first aperture and the second aperture being substantially concentric, the first aperture being smaller than the second aperture, the second aperture comprising a polarizer aligned to block the light polarized at the first polarization orientation; and
a processor coupled in communication with the first light source, the second light source and the image sensor, the processor being configured to control the first light source, the second light source and the image sensor, and to process the captured image to detect a gaze direction of the user.

2. The gaze-tracking system of claim 1, wherein the aperture device comprises a first portion and a second portion that are substantially concentric with each other, a periphery of the second portion being larger than a periphery of the first portion, wherein the first portion is substantially transparent to the light of the first type as well as the light of the second type, while the second portion is substantially transparent to the light of the second type, but is substantially non-transparent to the light of the first type, further wherein the first portion acts as the first aperture, while the first portion and the second portion together act as the second aperture.

3. The gaze-tracking system of claim 2, wherein the second portion is made of a material that is substantially transparent to the light in the second wavelength range, but is substantially non-transparent to the light in the first wavelength range.

4. The gaze-tracking system of claim 3, wherein the first portion is made of a material that is substantially transparent to the light in the first wavelength range as well as the light in the second wavelength range.

5. The gaze-tracking system of claim 3, wherein the first portion is an opening that allows the light of the first type and the light of the second type to pass therethrough.

6. The gaze-tracking system of claim 2, wherein the first portion is a polarizer that does not block the light polarized at the first polarization orientation.

7. The gaze-tracking system of claim 2, wherein the first portion is made of a material that has no polarizing effect.

8. The gaze-tracking system of claim 1, further comprising at least one mask positioned between the first light source and the user's eye, wherein the at least one mask is to be used to define a shape of the light of the first type, such that the at least one glint has the predefined shape.

9. The gaze-tracking system of claim 1, further comprising at least one semi-transparent reflective element, wherein the at least one semi-transparent reflective element is to be arranged on the optical path of the reflections of the light of the first type and the second type, such that when incident upon the at least one semi-transparent reflective element, the reflections of the light of the first type and the second type are reflected towards the image sensor.

10. The gaze-tracking system of claim 1, wherein the second light source is implemented by way of at least one image renderer of the head-mounted display apparatus.

11. The gaze-tracking system of claim 1, wherein the first light source comprises a plurality of illuminators arranged in a predefined pattern to define the predefined shape.

* * * * *